US012735871B2

(12) United States Patent
Dauderman

(10) Patent No.: US 12,735,871 B2
(45) Date of Patent: Sep. 15, 2026

(54) DYNAMIC ACQUISITION AND UTILIZATION OF SHARED JOBSITE DENSITY INFORMATION

(71) Applicant: Deere & Company, Moline, IL (US)

(72) Inventor: Bradley C. Dauderman, Dubuque, IA (US)

(73) Assignee: Deere & Company, Moline, IL (US)

( * ) Notice: Subject to any disclaimer, the term of this patent is extended or adjusted under 35 U.S.C. 154(b) by 661 days.

(21) Appl. No.: 16/984,692

(22) Filed: Aug. 4, 2020

(65) Prior Publication Data

US 2022/0042284 A1 Feb. 10, 2022

(51) Int. Cl.

| | |
|---|---|
| ***E02F 9/26*** | (2006.01) |
| ***E02F 3/76*** | (2006.01) |
| ***E02F 3/84*** | (2006.01) |
| ***E02F 9/20*** | (2006.01) |
| ***G06Q 10/20*** | (2023.01) |
| ***G07C 3/08*** | (2006.01) |

(52) U.S. Cl.

CPC .............. *E02F 9/261* (2013.01); *E02F 3/841* (2013.01); *E02F 9/2054* (2013.01); *G06Q 10/20* (2013.01); *G07C 3/08* (2013.01); *E02F 3/7609* (2013.01)

(58) Field of Classification Search

CPC ......... E02F 9/261; E02F 3/841; E02F 9/2054; E02F 3/7609; E02F 3/7618; E02F 9/205; E02F 9/262; E02F 9/265; G06Q 10/20; G07C 3/08

USPC ............................................................ 701/50

See application file for complete search history.

(56) References Cited

U.S. PATENT DOCUMENTS

2006/0025917 A1* 2/2006 Pandey .................... B60K 6/46 701/90
2008/0201045 A1* 8/2008 Kagoshima ............. E02F 9/123 701/50
2017/0124532 A1* 5/2017 Lintunen ........... G05B 19/4065

(Continued)

FOREIGN PATENT DOCUMENTS

DE 102019208302 A1 1/2020

OTHER PUBLICATIONS

German Search Report issued in application No. 102021116792.2 dated Dec. 13, 2023 (06 pages).

*Primary Examiner* — Abby J Flynn
*Assistant Examiner* — Sean Patrick Reidy
(74) *Attorney, Agent, or Firm* — Christopher J. Volkmann; KELLY, HOLT & CHRISTENSON PLLC

(57) ABSTRACT

A control system for an earth moving machine having an earth moving tool is provided. A position detection system provides an indication of a geographical position of the earth moving machine. A tool position sensor provides an indication of a position of the earth moving tool relative to the earth moving machine. A tool force sensor provides an indication of force exerted on the earth moving tool. A controller determines a tool engagement with a work surface at a position indicated by the position detection system based on the indication of the tool position. The controller generates jobsite density information based on the tool engagement and the indication of force exerted on the earth moving tool, the controller being further configured to cause a wireless communication module to provide an indication of the jobsite density for the position indicated by the position detection system to at least one remote device.

20 Claims, 10 Drawing Sheets

(56) References Cited

U.S. PATENT DOCUMENTS

| | | | | |
|---|---|---|---|---|
| 2018/0179719 | A1* | 6/2018 | Wisley | E02F 9/261 |
| 2018/0230671 | A1* | 8/2018 | Wu | E02F 3/437 |
| 2020/0032490 | A1* | 1/2020 | Ready-Campbell | E02F 9/262 |
| 2020/0056353 | A1 | 2/2020 | Ishibashi et al. | |
| 2020/0293059 | A1* | 9/2020 | Wang | G05D 1/0219 |
| 2021/0301501 | A1* | 9/2021 | Elkins | E02F 3/439 |

* cited by examiner

OBTAIN POSITION 202

GPS 204

OTHER 206

CALCULATE BLADE EDGE LOCATION 216

IMU 210

PISTON SENSORS 212

OTHER 214

MEASURE BLADE FORCE 218

STORE AS-BUILT SURFACE, LOCATION, AND DENSITY FOR LOCATION 220

TRANSMIT / STORE DATA 222

REAL-TIME 226

STORE / FORWARD 224

MOVE TO NEXT POSITION 228

PROVIDE DESIGN SURFACE 402

OBTAIN POSTION 404

GPS 406

OTHER 408

CALCULATE TOOL POSITION RELATIVE TO DESIGN SURFACE 416

IMU 412

PISTON SENSOR 414

OBTAIN OPERATOR INPUT(S) 418

JOYSTICK(S) 420

PEDAL(S) 422

OTHER 424

OBTAIN DENSITY FOR POSITION 426

ADJUST MACHINE OUTPUT BASED ON DENSITY 428

SPEED 430

HEIGHT 432

ANGLE 434

436

400

DYNAMIC ACQUISITION AND UTILIZATION OF SHARED JOBSITE DENSITY INFORMATION

FIELD OF THE DESCRIPTION

The present description relates generally to earth movers (such as dozers, graders, and excavators). More specifically, the present invention relates to improved control of such earth movers during earth moving operations.

BACKGROUND

Earthwork generally refers to the process of loosening, moving, and/or handling of earth quantities in the construction process. When earthwork is required, a design surface of a jobsite is typically generated and provided. This design surface is compared to an actual worksite surface to determine where and how much earth must be moved. Typically, the design surface is provided electronically to an earth mover, such as a bulldozer, grader, or excavator, and the operator will make one or more passes with the earth mover until the target design surface is achieved. Electronic control of the earth mover helps the operator know how much earth can be moved in a single pass in order to efficiently complete the operation.

The discussion above is merely provided for general background information and is not intended to be used as an aid in determining the scope of the claimed subject matter.

SUMMARY

A control system for an earth moving machine having an earth moving tool is provided. The control system includes a position detection system, a tool position sensor, a tool force sensor, a wireless communication module, and a controller. The position detection system is configured to provide an indication of a geographical position of the earth moving machine. At least one tool position sensor is configured to provide an indication of a position of the earth moving tool relative to the earth moving machine. The tool force sensor is configured to provide an indication of force exerted on the earth moving tool. The wireless communication module configured to provide wireless communication with at least one remote device. The controller is coupled to the position detection system, at least one tool position sensor, the tool force sensor and the wireless communication module. The controller is configured to determine a tool engagement with a work surface at a position indicated by the position detection system based on the indication of the tool position. The controller is further configured to generate jobsite density information based on the tool engagement and the indication of force exerted on the earth moving tool, the controller being further configured to cause the wireless communication module to provide an indication of the jobsite density for the position indicated by the position detection system to the at least one remote device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
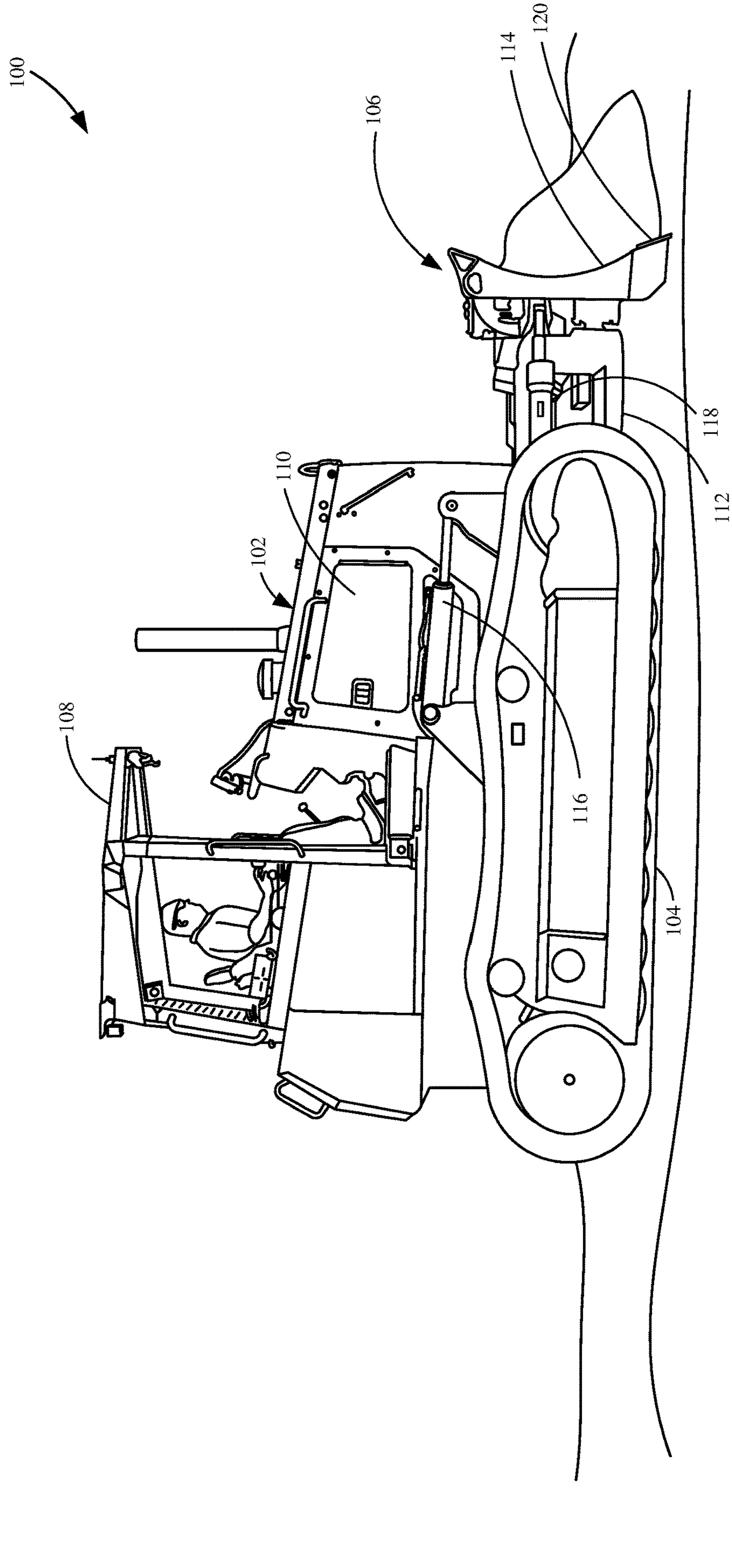
FIG. 1 is a diagrammatic view of a bulldozer with which embodiments described herein are particularly useful.

When relatively large earth moving jobs require the utilization of two or more earth moving machines, such as bulldozers, graders, and excavators, etc., it is important that the operation of such earth moving machines be coordinated in order to improve the efficiency of the earth moving work. Embodiments described herein generally provide an earth moving work machine with the ability to dynamically acquire earth condition data, such as density of earth moved at various positions as the earth mover work on the jobsite. This dynamically acquired earth data can then be shared with other earth moving machines directly, or may be stored in a centralized server, in order to facilitate access by other earth moving work machines as well as operators and managers of the jobsite operation.

Recently, new mastless grade control systems have begun to be used which place a GPS antenna on the cab/frame of the earth moving work machine and use inertial measurement units (IMUs) as well as cylinder position sensing to calculate or otherwise obtain the position of the cutting edge of a working tool of the earth moving machine. Since the GPS antenna is now located on the machine body, location of the machine's tracks/wheels can now be measured which allow the system to measure the actual jobsite grade. If each machine running or employing a grade control system continuously records actual jobsite grade and/or earth data and communicates it over a wireless telemetric system, the entire jobsite grade can be continuously mapped. This allows the jobsite operation to be tracked frequently, such as daily, which facilitates allowing owner/supervisors to track exactly how much earth is moved each day, along with knowing how much material is left to be moved and where it needs to be moved to.

Embodiments described herein facilitate advanced features to improve cutting/carrying/fill operations by communicating to each earth moving machine how to maximize or otherwise adjust tool position or when to transition from cutting to carrying to spreading the material. In some examples, each earth moving machine can measure the force exerted by the material being moved in order to provide a relatively rough indication of force per area of material moved/cut (psi). This quantity is roughly equivalent to a material hardness map of the jobsite.

Mapping material hardness of the entire jobsite can help the supervisor/owner optimize productivity by determining best machine/operation for ground conditions. For example, a supervisor/owner can determine, based on real-time ground conditions, that a ripping machine is required. Further, grade control systems can also automatically change their aggressiveness/tune settings based on the material hardness map. In this way, if the material hardness changes as the earth moving operation cuts further into the earth, this change can be automatically detected and compensated by the various earth machines working on the job. In some examples, each earth moving machine collects its own earth data from its operation and sends such dynamically measured information wirelessly to a centralized server to map the entire jobsite. Then, this information can be sent to other individual earth moving machines such that they can adjust their operation based on the measured earth data.

FIG. 1 is a diagrammatic view of a dozer with which embodiments described herein are particularly useful. Note, while embodiments will be described with respect to a dozer, they are equally applicable to any earth moving work machine, such as grader, an excavator, or any other machine that may be employed to move significant quantities of earth. Dozer 100 generally includes a vehicle body 102, movement system 104, and work implement 106. In the example shown, movement mechanism 104 includes a pair of tracks. However, movement mechanism 104 can additionally or alternatively include wheels as well.

Vehicle body 102 generally includes an operator cabin 108 and an engine compartment 110. Operator cabin 108 is configured to house an operator and includes user interface devices, such as joysticks and pedals, as well as an operator seat. In the example shown, engine compartment 110 is generally disposed in front of operating cabin 108. Movement mechanism 104 generally positioned at the base of vehicle body 102 and, in the illustrated tracked version, includes a pair of tracks that engage the work surface to move dozer 100.

Work implement 106 is attached to vehicle body 102 via frame 112 and supports blade 114. Cylinder 116 is generally hydraulically actuated and controls the overall height of blade 114 by pivoting frame 112 about a pivot point (not shown in FIG. 1). Additionally, a second hydraulic actuator 118 is also provided that controls the angle of blade 114. A cutting edge 120 is located at a lower end of blade 114 and may be formed by a replaceable cutting bar. As can be appreciated, based on the actuation (i.e., position of pistons within respective cylinders) of cylinders 116 and 118, the position of cutting edge 120 is known precisely with respect to machine body 102. Additionally, or alternatively, the position of cutting edge 120 can be determined by using an IMU located on body 102, an IMU mounted on blade 114. Additionally, an IMU may also be mounted to frame 112 to provide more precise movement information.

Figure 2:
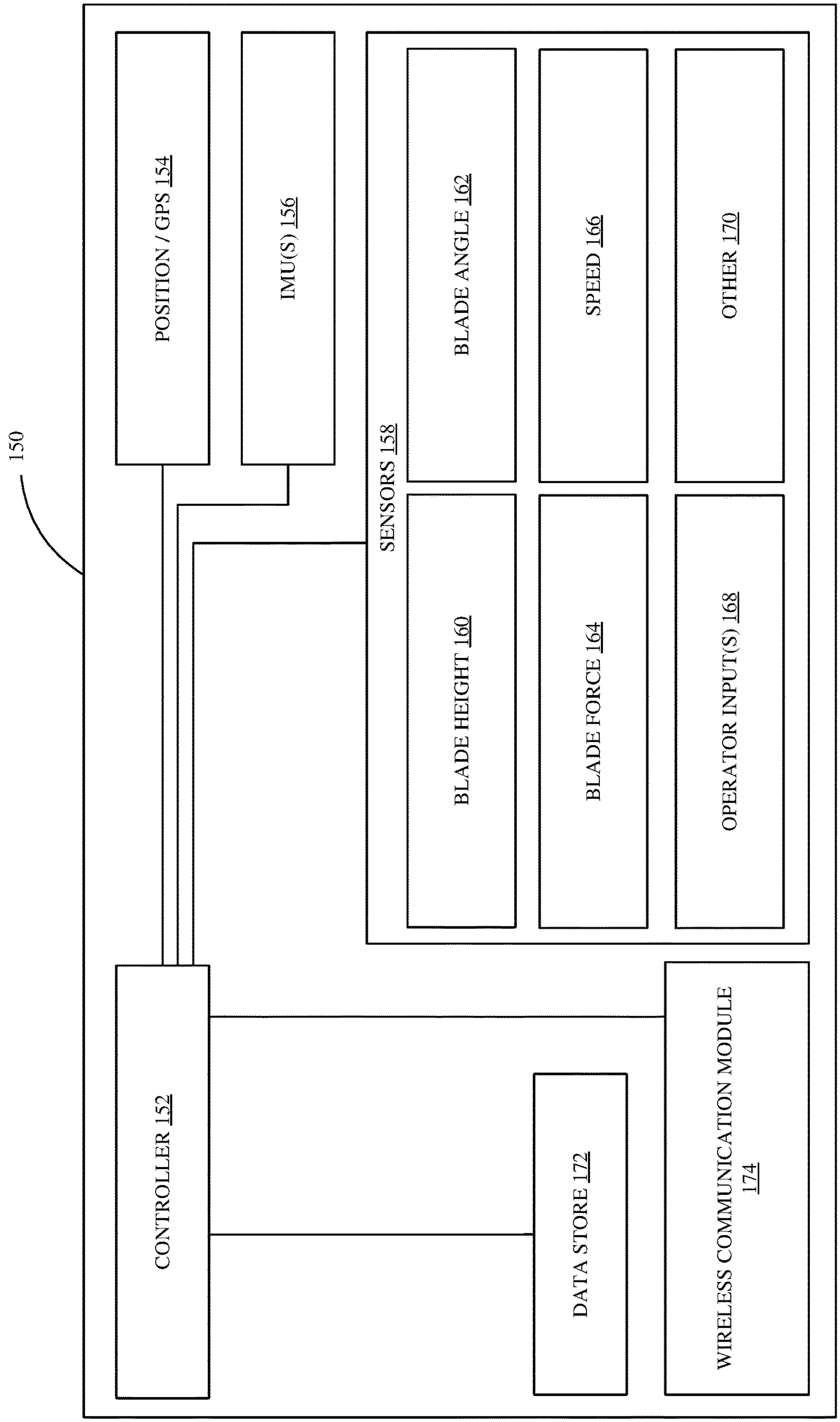
FIG. 2 is a block diagram of a portion of an earth mover control system in accordance with one embodiment.

FIG. 2 is a block diagram of a portion of an earth mover control system in accordance with one embodiment. Control system 150 generally includes a controller 152 that is able to execute a sequence of programmatic instructions or respond to programmatic events in order to provide one or more control functions of the earth moving machine. In one example, controller 152 is or includes a microprocessor. However, other suitable digital components or combinations thereof can be used for controller 152. Controller 152 is communicatively coupled to position/GPS module 154 in order to receive an indication of the earth moving machine's geographic position. Suitable examples of position sensors include any suitable global navigation satellite system (GNSS) that provides geo-location and time information to a suitable receiver anywhere on earth. In one example, the GNSS device is a GPS receiver. However, other suitable GNSS devices, such as the Russian (GLONASS) system can be used. Further, differential GPS technologies can also be used with respect to module 154. Finally, non-GNSS position-based signaling systems, such as LORAN or cellphone/WIFI triangulation, can be used for position sensor module 154. Regardless of the technology employed for position sensor module 154, controller 152 is able to receive an indication of the location of the earth moving machine from module 154. Controller 152 is also coupled to one or more inertial measurement units 156. Inertial measurement units are known devices that can detect acceleration, gravity, orientation, angular rotation, etc. The one or more IMUs 156 are coupled to machine body 102 to provide an indication of acceleration, gravity, orientation, etc. of dozer 100.

Controller 152 is also coupled to one or more sensors 158. These sensors provide an indication of blade height 160, blade angle 162, blade force 164, machine speed 166, operator inputs 168, and/or other suitable parameters 170. The actual technology used for each of the individual sensors can vary in accordance with the various embodiments described herein. For example, the blade height sensor 160 may be a piston position sensor disposed on or within cylinder 116 (shown in FIG. 1) in order to transduce or otherwise detect the position of the hydraulic piston within the cylinder, which position is indicative of blade height. However, sensor 160 could be a rotary encoder decoder disposed about the pivot point of frame 118 (shown in FIG. 1) such that as frame 112 rotates about the pivot point, the angular position of frame 112, and thus the height of blade 114, can be known. Additionally, or alternatively, blade height sensor 160 could be an optical device or camera that simply measures or provides an indication of blade height based on an image obtained of blade 114. As can be appreciated, various options exist for sensing the various parameters. For example, as set forth above, various IMUs can be mounted to portions of the earth mover (e.g. body, blade, frame, etc.).

Blade angle sensor 162, like blade height sensor 160, can use various suitable technologies, including hydraulic piston position sensing, suitable encoders, optical techniques, IMU(s), etc.

Blade force sensor 164 can include a strain gauge or load force sensor mounted directly on the blade that detects deformation or strain of the material directly while the blade interacts with the jobsite. Alternatively, or additionally, blade force sensor 164 be a strain gauge or other suitable device mounted to frame 112 measuring forces thereon. Further, blade force sensor 164 may be formed of two or more individual sensors such that different forces on the blade (from left to right from the driver's perspective) can be measured. Additionally, or alternatively, blade force can be measured by the traction pushing force exerted by the transmission-drawbar.

Speed sensor 166 may be provided simply by virtue of software using the signal from GPS position module 154 over time. Speed sensor 166 can include a sensor that senses the rotation or movement of movement mechanism 104.

However, since it is possible for the movement mechanism 104 to slip or lose traction, it is preferred that speed sensor 166 use IMU signals, such an IMU mounted to the body of the earth mover.

Operator input(s) 168 can be any suitable input devices that provide signals based on operator interaction therewith. Examples of operator inputs include buttons, knobs, dials, joysticks, levers, touch screens, etc.

Controller 152, by virtue of knowing the machine geographical position from module 154 and receiving blade height, blade tilt (e.g. raise/lower left side of blade while doing the opposite on the right side) and blade angle (e.g. move left side closer/farther from the operator while doing the opposite on the right side) information can compute the degree to which cutting edge 120 (shown in FIG. 1) is engaged with the jobsite surface. For example, controller 152 may know that cutting edge 154 is located 6 inches below the jobsite surface. Given the width of the blade, and the measured blade force from sensor 164, controller 152 calculates the blade force per square inch of blade 114 that is engaged with the jobsite surface. This quantity is considered a rough indication of material density at the exact position indicated by module 154. Controller 152 stores this density indication in data store 172 and/or communicates it wirelessly to a centralized server or other earth moving machine using wireless communication module 174.

Wireless communication module 174 is coupled to controller 152 and provides controller 152 with bi-directional wireless communication in accordance with at least one wireless communication protocol. Examples of suitable wireless communication protocols include, without limitation, Bluetooth (such as Bluetooth Specification 2.1 rated at Power Class 2); a Wi-Fi specification (such as IEEE 802.11.a/b/g/n); a known RFID specification; cellular communication techniques (such as GPRS/GSM/CDMA); WiMAX (IEEE 802.16), and/or satellite communication.

Figure 3:
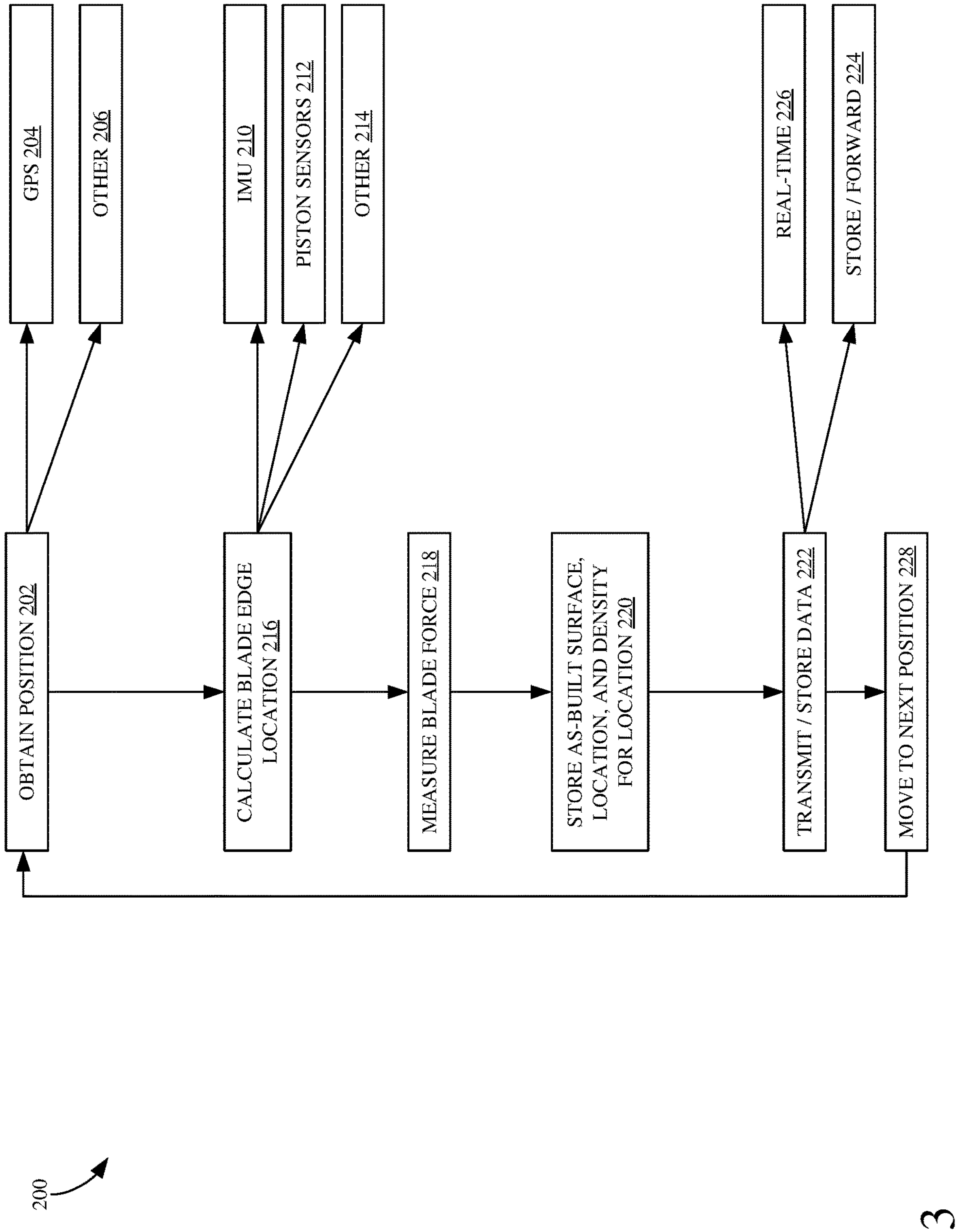
FIG. 3 is a flow diagram of a method of obtaining earth moving jobsite information in accordance with one embodiment.

FIG. 3 is a flow diagram of a method of obtaining earth moving jobsite information in accordance with one embodiment. In one example, method 200 is provided by a controller, such as controller 152, of an earth moving machine. However, embodiments can be practiced where the earth moving machines continuously provide position data, tool engagement data (i.e., blade height, blade tilt, and blade angle) and force information, and the density calculations and storage thereof relative to geographic position are performed by a centralized server or other suitable computing device.

Method 200 begins at block 202 where the earth moving machine obtains an indication of its position. As indicated at block 204, this indication can be provided using a GPS receiver. However, the position may be obtained in other ways, as indicated at block 206.

Using the obtained position information from block 208, method 200 moves to block 216 where the blade cutting edge location is calculated relative to the earth moving machine. This calculation can employ IMU information 210 from one or more IMUs and/or information from one or more piston position sensors 212 within or coupled to hydraulic cylinders that control blade or tool position. Additionally, or alternatively, any suitable other information or sensor data relative to the tool position can be used, as indicated at block 214. Once the blade cutting edge position is determined relative to the earth moving machine, the blade cutting edge location is known with respect to the jobsite surface. Thus, the degree to which the blade edge is engaged with the jobsite surface (i.e., 6 inches deep, one foot deep, etc.) is determined. Next, at block 218, the blade force is measured. At block 220, a quantity related to blade force preferably divided by the degree to which the blade is engaged with the jobsite surface (pounds per square inch) is determined and stored along with an association of the machine's position obtained at block 202 and an indication of the as-built surface. Note, the blade force is a combination of cutting force and carry force. The cutting force is the force exerted by earth that has not been moved (i.e. it is being cut from the ground) and carrying force is the force exerted by earth that has been cut and is being displaced or carried by the blade. In accordance with one embodiment, the carry force/load is subtracted from the blade force in order to provide an estimation of real-time blade cut force. In one example, the force at the beginning of a pass (i.e. blade is not carrying any earth) is used as an indication of blade cut force. Additional techniques, such as integrating or adding an expected amount of earth based on the tool engagement depth, displacement distance, and linear increases in blade force can be used to isolate blade cutting force as the earth mover operates in order to provide rough density information.

Next, at block 222, the rough density value, machine position, and as-built surface information are stored in the machine for transmission when the machine obtains a suitable wireless communication signal as indicated at store/forward block 224, or simply transmitted wirelessly in real-time as indicated at block 226. Method 200 iterates as the earth moving machine moves to different positions, and this iteration is indicated at block 228.

Figure 4:
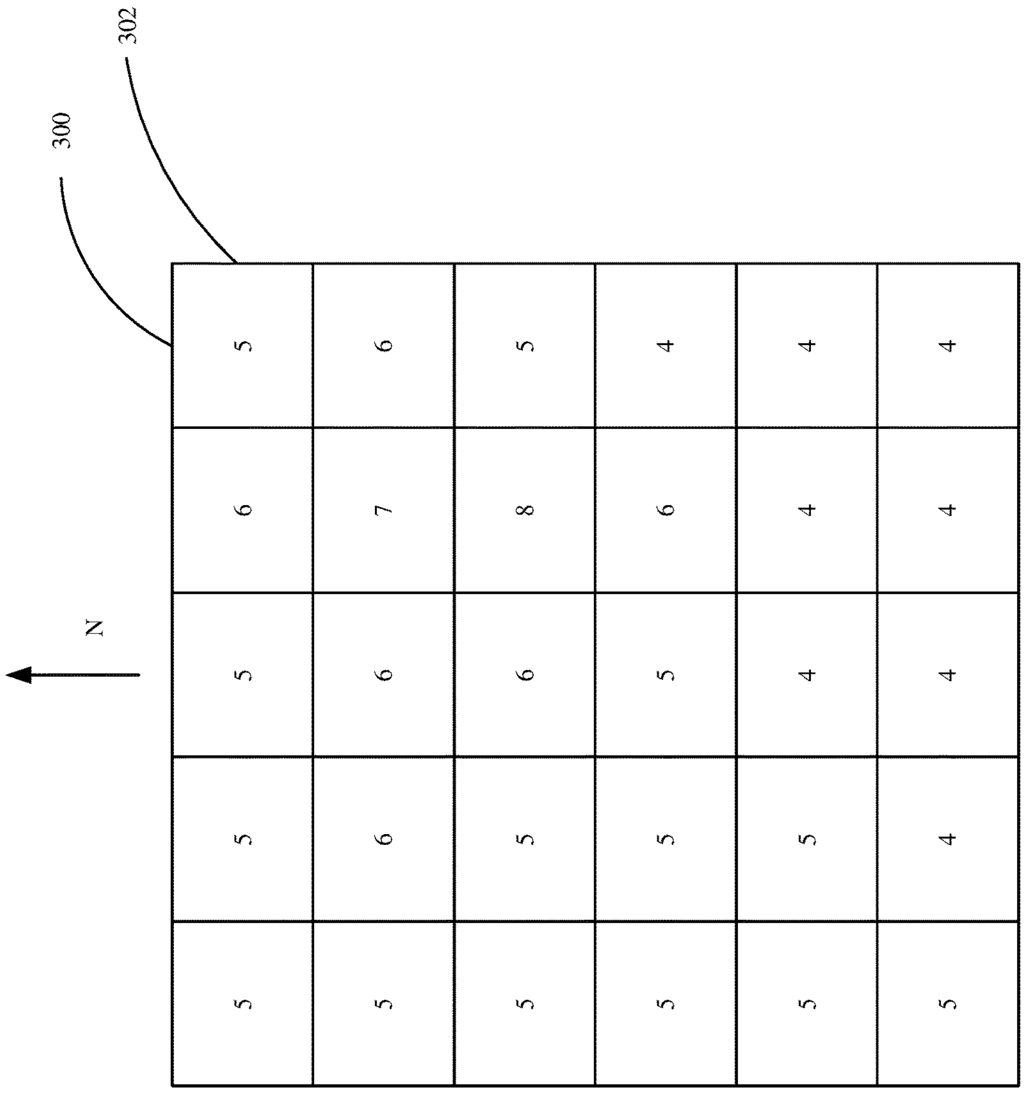
FIG. 4 is a diagrammatic view of an exemplary rough material density table generated by the method described with respect to FIG. 3.

FIG. 4 is a diagrammatic view of an exemplary rough material density table generated by the method described with respect to FIG. 3. As shown in FIG. 4, a jobsite 300 is broken into 30 different location cells 302 and a rough material density that is derived or obtained based on an indication of blade force divided by blade engagement of an earth moving machine is stored with respect to each location 302. The physical size of each location 302 can vary based on the required granularity, the size of the jobsite, sensor precision, position accuracy and precision, etc. Further, the number of individual cells in the map can vary. Regardless, a map of geographical position to rough material density is generated. As can be seen, the jobsite material density varies from a quantity of 4 all the way up to a quantity of 7 with respect to material density. This means that earth moving machines working in one of the locations where the density value is lower, may be able to engage their blade or cutting tool somewhat deeper or more aggressively as the machine operates than when an earth moving machine is working on a cell 302 that has a density quantity of 7. The map illustrated in FIG. 4 is exemplary only a preferably exists in a centralized server and is continuously updated as the earth moving operations occur, where the updated information is continuously shared among the plurality of earth moving machines operating on the jobsite. In this way, even if the density of material changes as the jobsite is dug down or built up, the density changes can be automatically detected and compensated to increase the overall efficiency of the operation.

Figure 5:
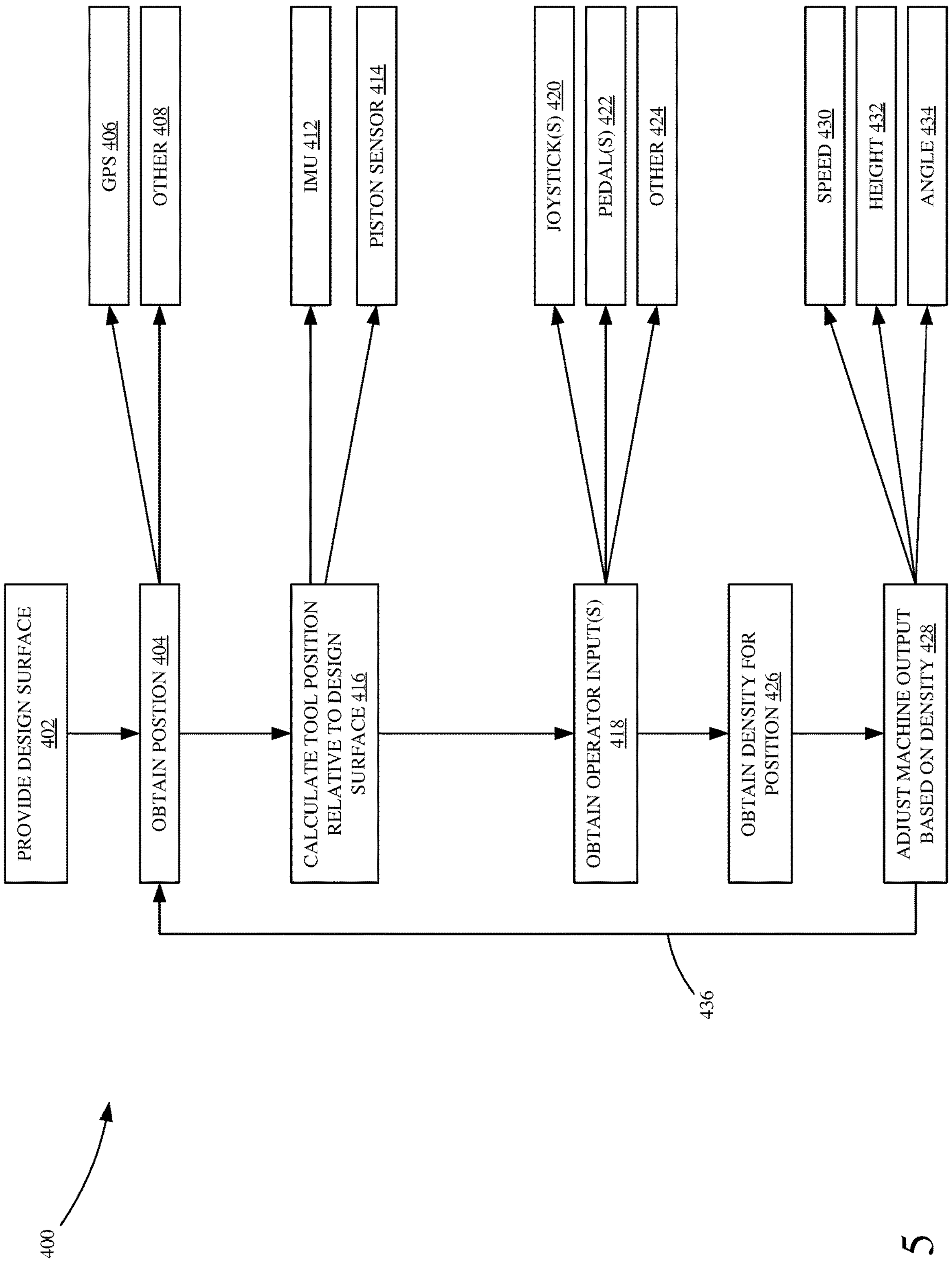
FIG. 5 is a flow diagram of a method of operating an earth moving machine utilizing a shared jobsite material density map in accordance with one embodiment.

FIG. 5 is a flow diagram of a method of operating an earth moving machine utilizing a shared jobsite material density map in accordance with one embodiment. Method 400 begins at block 402 where an earth moving machine is provided with a design surface. This design surface is typically entered electronically into an earth moving machine in the form of desired surface planes, etc. Next, at block 404, the earth moving machine obtains its current position. As illustrated, this may be via a GPS receiver as indicated at block 406, or via other suitable techniques as indicated at block 408. At block 416, the earth moving machine obtains an indication of tool position relative to the earth moving machine. This indication is generated based on signals from one or more inertial measurement units 412, as well as one or more piston position sensors 414 relative to hydraulic actuators that control the height, tilt, and angle of the tool. Based on the acquired information, at block 416, the tool position is calculated relative to the design surface provided at block 402. Next, at block 418, one or more operator inputs with respect to the earth moving operation is received. These operator inputs may come from more joysticks 420, pedals 422, or other suitable operator inputs 424. In this way, the degree to which the operator is commanding the tool to engage the jobsite surface, either manually or automatically, the tool can be determined.

Next, at block 426, material density information is obtained for the relative position determined at block 404. This may be performed by generating wireless communication with a centralized server and querying the server based on the position information to obtain associated density information. However, the information can also be obtained by querying a local data store of the earth moving machine as long as the local data store is continuously, or suitably periodically, updated with density information from other earth moving machines, or the centralized server. Next, at block 428, one or more earth moving machine parameters are adjusted (i.e., modified from the operator-specified initial conditions) based on the obtained density information. Examples of modifications include adjusting overall machine speed, as indicated at block 430, adjusting blade height, as indicated at block 432, and/or adjusting blade angle, as indicated at block 434. Further, various combinations of these adjustments can also be performed in accordance with embodiments herein. As illustrated at reference numeral 436, method 400 generally iterates as the machine moves and thus a new position is obtained when the machine moves. This is illustrated at reference numeral 436 showing control returning to block 404.

Figure 6:
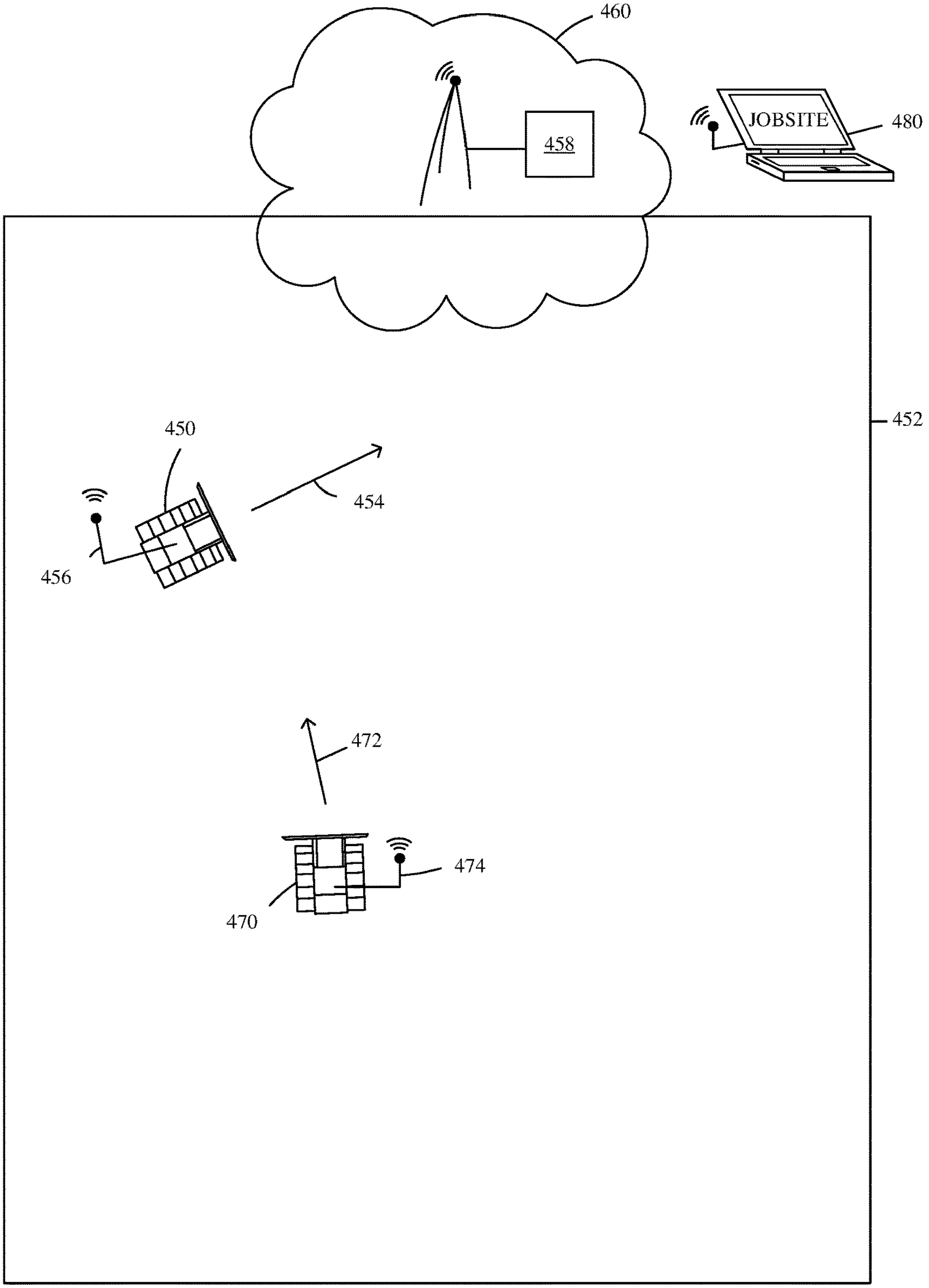
FIG. 6 is a diagrammatic view of a plurality of earth moving machines operating upon a jobsite in accordance with one embodiment.

FIG. 6 is a diagrammatic view of a plurality of earth moving machines operating upon a jobsite in accordance with one embodiment. As shown, earth moving machine 450 is operating upon jobsite 452 and moving in the direction indicated by arrow 454. As earth moving machine 450 operates, it is dynamically generating as-built data, and material density information, for each geographic position that it traverses. This information is transmitted wirelessly, as indicated diagrammatically via antenna 456 to a centralized server 458. Centralized server 458 may be located on the jobsite and interact wirelessly directly with the various earth moving machines, or centralized server may be located remote from the jobsite and coupled communicatively to the various earth movers via the Internet. In such instance, server 458 could be considered to be in the cloud, as indicated at reference numeral 460.

As shown in FIG. 6, a second earth moving machine 470 is also working on jobsite 452 and is moving in direction 472. As earth moving machine 470 operates, it is also providing as-built data and material density information wirelessly as indicated diagrammatically via antenna 474. Additionally, as each of earth movers 450 and 470 operate upon jobsite 452, they are also receiving updated material density information from centralized server 458. Accordingly, when earth mover 470 crosses the portion of jobsite 452 that has already been worked by earth mover 450, its operation will be guided, or otherwise adjusted, based on the material density information provided by earth mover 450. As set forth above, this guidance may be manifested in a more conservative or aggressive setting on the earth moving tool of earth mover 470 and/or the speed with which earth mover 470 operates when it is in such position.

As shown in FIG. 6, one or more operator consoles or client devices 480 can be used to view or analyze information in centralizer server 458. In this way, a jobsite supervisor, or owner, can make decisions based on real-time operation of the various earth movers on the jobsite. For example, a productivity output, such as an hourly summary can be provided to the owner and manager and be shared with the individual operators of the earth moving machines. Further, the manager of the overall jobsite will have a real-time indication of whether the operation is on schedule or behind schedule based on the materials and will also have a clear indication of reasons why a jobsite operation may be behind schedule, such as an indication that the material density has increased and that the operation has slowed accordingly.

The degree to which each earth moving machine has worked upon various density jobsites will facilitate a record of machine use that may be more accurate than simply an indication of hours of operation. For example, an earth moving machine that has an hour of operation on a very dense material may sustain more wear than one that has an hour of operation on very loose material. This indication can be provided with respect to undercarriage maintenance, hydrostatic system maintenance or repair, etc. Moreover, the maintenance information can also be used to generate predictive maintenance schedules based on hours of operation with specific density jobsites.

The present discussion has mentioned processors and servers. In one embodiment, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. They can take a wide variety of different forms and can have a wide variety of different user actuatable input mechanisms disposed thereon. They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 7:
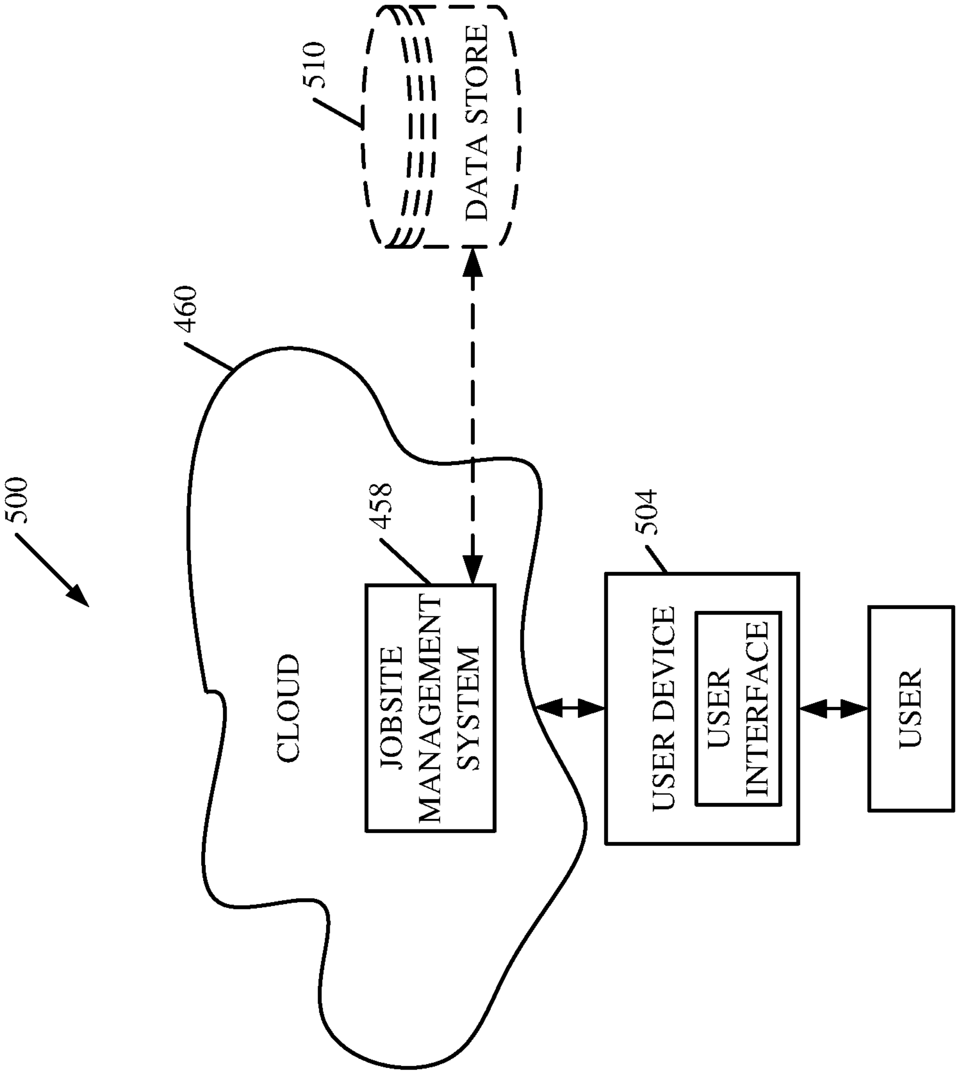
FIG. 7 is a block diagram of harvester 100, shown in FIG. 1, except that it communicates with elements in a remote server architecture 500.

FIG. 7 is a block diagram of server/jobsite management system 458, shown in FIG. 6, except that it communicates with elements in a remote data store 510. In an example embodiment, server/jobsite management system 458 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

By way of example, data store 510 containing substantially real-time dynamic jobsite density map information and/or earth mover maintenance information can be disposed at a location separate from jobsite management system 458, and accessed through the cloud 460 using jobsite management system 458. Regardless of where they are located, they can be accessed directly by earth movers in accordance with the various embodiments described above, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent.

It will also be noted that the elements of FIG. 7, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
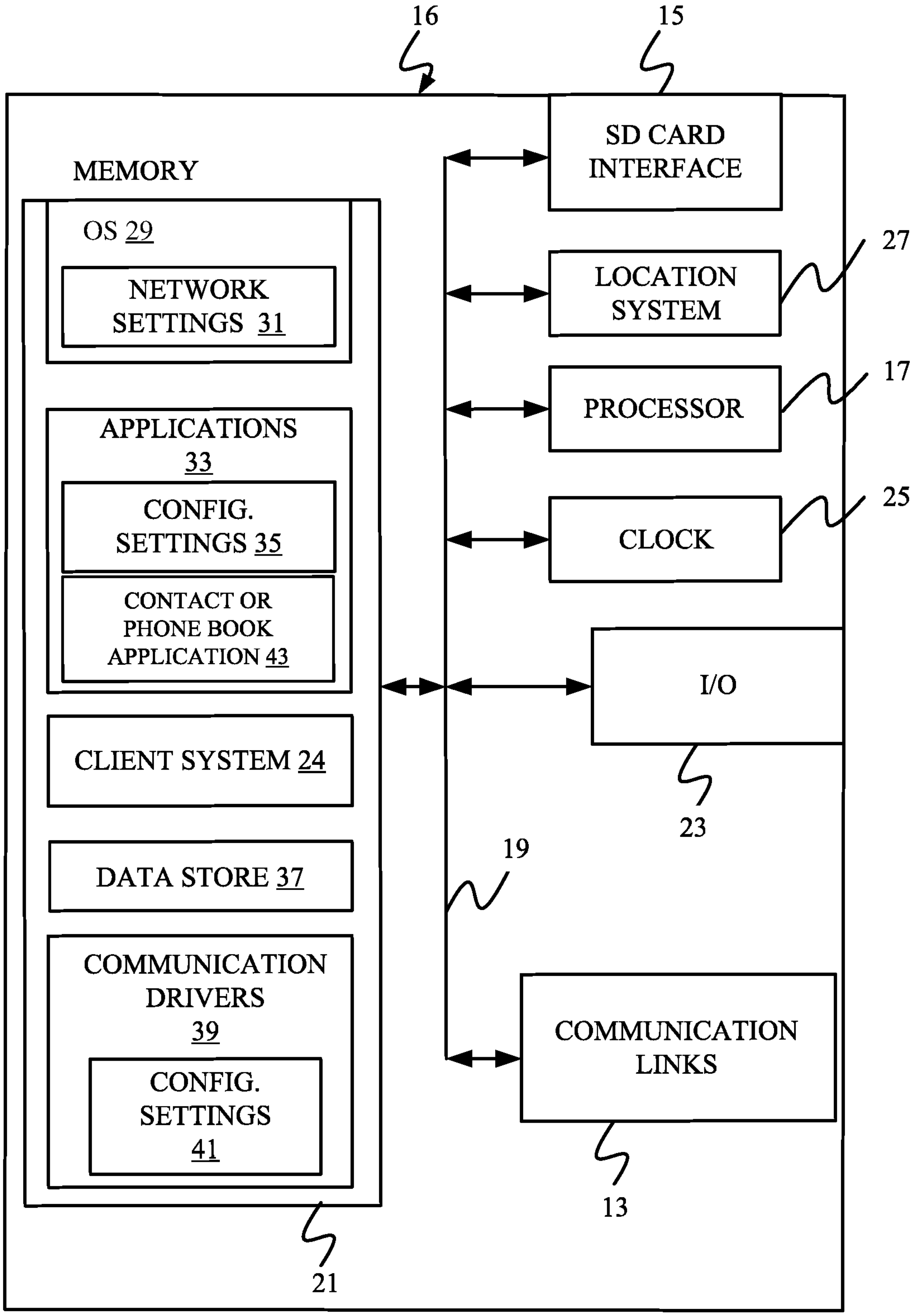
FIG. 8 is a general block diagram of the components of a client device that can run some components shown in FIG. 6.

FIG. 8 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of dozer 450 or the jobsite mobile device 480.

FIG. 8 provides a general block diagram of the components of a client device 16 that can run some components shown in FIGS. 2 and/or 6, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Figure 9:
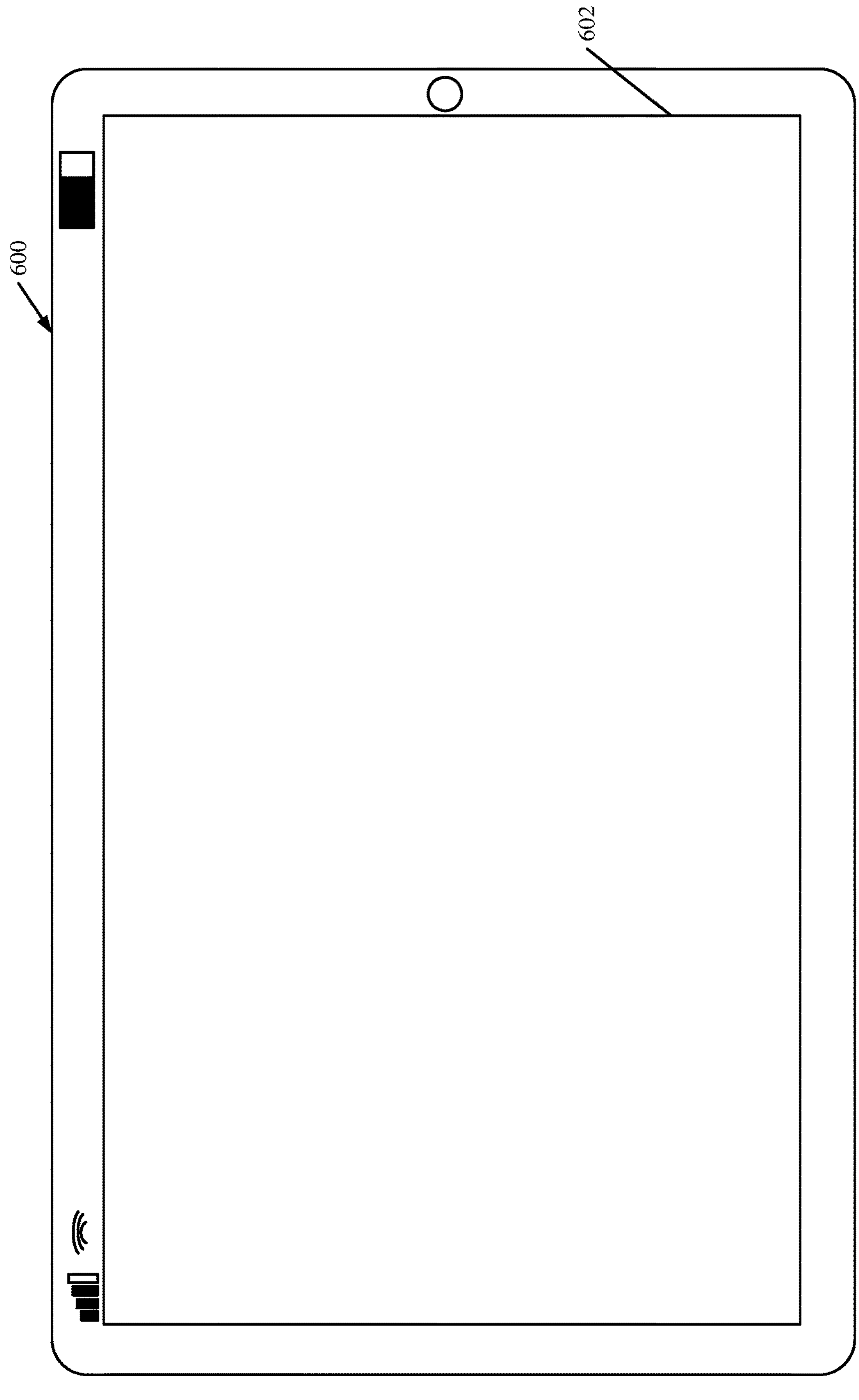
FIG. 9 shows one embodiment in which the client device is a tablet computer.

FIG. 9 shows one embodiment in which device 16 is a tablet computer 600. In FIG. 9, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 10:
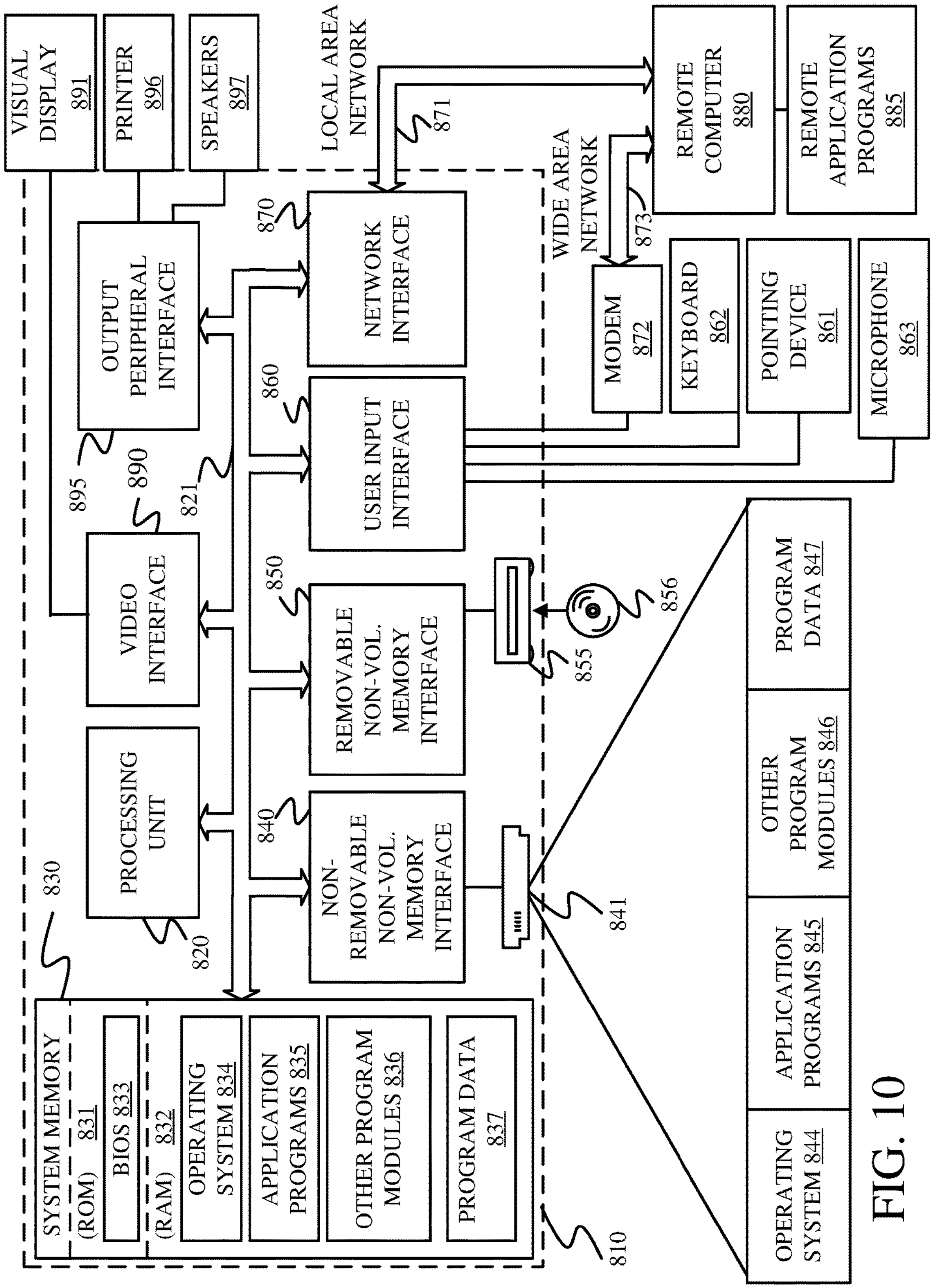
FIG. 10 is a block diagram of one embodiment of a computing environment in which elements of FIG. 2, or parts of it, (for example) can be deployed.

FIG. 10 is one embodiment of a computing environment in which elements of FIGS. 2 and/or 6, or parts of it, (for example) can be deployed. With reference to FIG. 10, an exemplary system for implementing some embodiments includes a general-purpose computing device in the form of a computer 810. Components of computer 810 may include, but are not limited to, a processing unit 820 (which can comprise processor 108), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, a magnetic disk drive 851, nonvolatile magnetic disk 852, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a control system for an earth moving machine having an earth moving tool. The control system includes a position detection system, a tool position sensor, a tool force sensor, a wireless communication module, and a controller. The position detection system is configured to provide an indication of a geographical position of the earth moving machine. At least one tool position sensor is configured to provide an indication of a position of the earth moving tool relative to the earth moving machine. The tool force sensor is configured to provide an indication of force exerted on the earth moving tool. The wireless communication module configured to provide wireless communication with at least one remote device. The controller is coupled to the position detection system, the at least one tool position sensor, the tool force sensor and the wireless communication module. The controller is configured to determine a tool engagement with a work surface at a position indicated by the position detection system based on the indication of the tool position. The controller is further configured to generate jobsite density information based on the tool engagement and the indication of force exerted on the earth moving tool, the controller being further configured to cause the wireless communication module to provide an indication of the jobsite density for the position indicated by the position detection system to the at least one remote device.

Example 2 is the control system of any or all previous examples wherein the position detection system is configured to be mounted to a body of the earth moving machine.

Example 3 is the control system of any or all previous examples wherein the position detection system include a GPS receiver.

Example 4 is the control system of any or all previous examples wherein the at least one tool position sensor includes a blade height sensor configured to detect a height of a blade relative to the work surface.

Example 5 is the control system of any or all previous examples wherein the blade height sensor includes a piston position sensor coupled to a piston that actuates a frame on which the blade is mounted.

Example 6 is the control system of any or all previous examples wherein the at least one tool position sensor includes a blade angle sensor configured to detect an angle of a blade relative to the work surface.

Example 7 is the control system of any or all previous examples wherein the blade angle sensor includes a piston position sensor coupled to a piston that controls the angle of the blade.

Example 8 is the control system of any or all previous examples wherein the remote device is server.

Example 9 is the control system of any or all previous examples wherein the server is accessible via an internet connection.

Example 10 is the control system of any or all previous examples wherein the remote device is another earth moving machine.

Example 11 is the control system of any or all previous examples wherein the controller includes a microprocessor.

Example 12 is the control system of any or all previous examples wherein the controller is configured to provide as-built work surface information, and the jobsite density information for the position detected by the position control system.

Example 13 is the control system of any or all previous examples and further comprising a data store coupled to the controller and configured to store the as-built work surface information and the jobsite density information.

Example 14 is a method of sharing jobsite density information relative to at least one earth moving machine. The method includes determining a geographic position of a first earth mover and determining a degree to which a tool of the first earth mover is engaged in a work surface at the determined geographic position. A force on the tool of the first earth mover is measured and jobsite density information is generated for the determined geographic position based on the degree to which the tool is engaged in the work surface and the measured force on the tool. The jobsite density information is stored at a location remote from the first earth mover.

Example 15 is the method of any or all previous examples and further comprising providing the jobsite density information to a second earth mover operating on the jobsite.

Example 16 is the method of any or all previous examples and further comprising adjusting operation of the second earth mover based on a position of the second earth mover and the jobsite density information.

Example 17 is the method of any or all previous examples wherein adjusting operation of the second earth mover includes changing a tool engagement level of the second earth mover.

Example 18 is the method of any or all previous examples and further comprising generating maintenance information for the earth mover based on operation of the earth mover on the jobsite and the jobsite density information.

Example 19 is a jobsite management system for sharing jobsite density information between a plurality of earth movers on a jobsite. The jobsite management system includes a network connection configured to receive jobsite density information from a first earth mover, the jobsite density information including jobsite density values associated with geographic positions where the jobsite density values were obtained. A processor is coupled to the network connection and is configured to store the jobsite density information in a data store, the processor being further configured to receive a request for jobsite density values from a second earth mover via the network connection based on a position of the second earth mover and obtain requested jobsite density values from the data store and provide the requested jobsite density values to the second earth mover.

Example 20 is the jobsite management system of any or all previous examples wherein the processor is further configured to provide maintenance information relative to at least one of the plurality of earth movers based at least in part on the jobsite density values.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A control system for an earth moving machine having an earth moving tool having a width, the control system comprising:

- a machine position sensor that includes a GPS receiver, the machine position sensor configured to provide an indication of a geographical position of the earth moving machine;
- at least one tool position sensor configured to provide an indication of a relative position of the earth moving tool relative to the earth moving machine;
- a tool force sensor configured to provide an indication of force exerted on the earth moving tool during an earth removal operation at the geographical position of the earth moving machine; and
- a controller coupled to the machine position sensor, the at least one tool position sensor, and the tool force sensor, the controller being configured to:
  - identify a carrying force exerted by previously cut earth that has been cut, prior to the geographical position of the earth moving machine, and is being carried on the earth moving tool at the geographical position;
  - determine a depth to which the earth moving tool is engaged with a work surface at the geographical position indicated by the machine position sensor based on the indication of the relative position of the earth moving tool relative to the earth moving machine;
  - calculate a cutting force by subtracting the carrying force from the indication of force provided by the tool force sensor, the cutting force representing the force exerted by earth being cut at the geographical position of the earth moving machine;
  - calculate a force per area indication of the work surface at the geographical position indicated by the machine position sensor based on
    - the depth to which the earth moving tool is engaged with the work surface at the geographical position, the width of the earth moving tool, and the cutting force exerted by the earth at the geographical position;

wirelessly provide the force per area indication for the geographical position indicated by the machine position sensor; and control engagement of the earth moving tool based on a force per area indication corresponding to a different geographical position of the earth moving machine.

2. The control system of claim 1, wherein the at least one tool position sensor includes a blade height sensor configured to detect a height of a blade relative to the work surface.

3. The control system of claim 2, wherein the blade height sensor includes a piston position sensor coupled to a piston that actuates a frame on which the blade is mounted.

4. The control system of claim 1, wherein the at least one tool position sensor includes a blade angle sensor configured to detect an angle of a blade relative to the work surface.

5. The control system of claim 1, wherein the at least one tool position sensor includes a blade tilt sensor configured to detect a tilt of a blade relative to the work surface.

6. The control system of claim 1, wherein the at least one tool position sensor includes an inertial measurement unit (IMU).

7. The control system of claim 1, wherein the indication for force per area is wirelessly provided to another earth moving machine.

8. The control system of claim 1, wherein the controller is configured to provide as-built work surface information, and the force per area indication for the geographical position detected by the machine position sensor.

9. The control system of claim 1, wherein the controller is configured to store as-built work surface information and the force per area indication in a data store.

10. The control system of claim 1, wherein the controller is configured to generate a jobsite map.

11. The control system of claim 1, wherein the at least one tool position sensor comprises at least one piston position sensor coupled to a hydraulic cylinder that affects movement of the earth moving tool.

12. The control system of claim 1, wherein the tool force sensor is configured to measure a traction pushing force exerted by a drawbar of the earth moving machine.

13. The control system of claim 1, wherein the force per area indication is an estimate of material hardness of the work surface at the geographical position.

14. The control system of claim 1, wherein the controller is configured to:

estimate the previously cut earth being carried on the earth moving tool based on one or more parameters; and calculate the carrying force based on the estimated previously cut earth being carried on the earth moving tool.

15. The control system of claim 14, wherein the one or more parameters comprise at least one of:

a tool engagement depth, a displacement distance, or linear increases in blade force.

16. The control system of claim 1, wherein the force per area indication corresponding to the different geographical position is received from another earth moving machine.

17. A method of sharing jobsite information relative to at least one earth moving machine, the method comprising:

determining a geographic position of a first earth moving machine using a machine position sensor;

identifying a carrying force exerted by previously cut earth that has been cut, prior to the determined geographic position of the first earth moving machine, by an earth moving tool of the first earth moving machine and is being carried on the earth moving tool at the determined geographic position;

determining a depth to which the earth moving tool of the first earth moving machine is engaged with a work surface of a jobsite at the determined geographic position using at least one tool position sensor of the earth moving tool, the earth moving tool having a width;

measuring a total force on the earth moving tool using a tool force sensor;

calculating a cutting force by subtracting the carrying force from the total force;

calculating an indication of force per area of the jobsite at the determined geographic position of the first earth moving machine, the force per area being calculated based on the depth to which the earth moving tool is engaged with the work surface, the width of the earth moving tool, and the calculated cutting force;

sharing the indication of force per area to a second earth moving machine operating on the jobsite; and adjusting operation of the second earth moving machine based on a position of the second earth moving machine and the force per area indication shared to the second earth moving machine.

18. The method of claim 17, wherein adjusting operation of the second earth moving machine includes changing a tool engagement level of the second earth moving machine.

19. The method of claim 17, and further comprising generating, with a processor, maintenance information for at least one machine, of the first earth moving machine or the second earth moving machine, based on operation of the respective first and second earth moving machines on the jobsite and a jobsite density.

20. A method comprising:

determining a geographical position of an earth moving machine;

identifying a carrying force exerted by previously cut earth that has been cut, prior to the geographical position of the earth moving machine, by an earth moving tool of the earth moving machine and is being carried on the earth moving tool at the geographical position;

determining a depth to which the earth moving tool is engaged with a work surface at the geographic position using at least one tool position sensor of the earth moving tool, the earth moving tool having a width;

measuring a total force on the earth moving tool using a tool force sensor;

generating an estimate of real-time tool cutting force by subtracting the carrying force from the total force;

calculating a force per area indication at the determined geographic position of the earth moving machine, the force per area indication being calculated based on the depth to which the earth moving tool is engaged with the work surface, the width of the earth moving tool, and the estimate of real-time tool cutting force; and controlling engagement of the earth moving tool based on a force per area indication corresponding to one or more geographical positions of the earth moving machine.

* * * * *